United States Patent
Han

(10) Patent No.: US 9,516,590 B2
(45) Date of Patent: Dec. 6, 2016

(54) METHOD, DEVICE AND SYSTEM FOR DISCONTINUOUS RECEPTION

(71) Applicant: Huawei Technologies Co., Ltd., Shenzhen, Guangdong (CN)

(72) Inventor: Guanglin Han, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 224 days.

(21) Appl. No.: 13/940,023

(22) Filed: Jul. 11, 2013

(65) Prior Publication Data

US 2013/0294313 A1    Nov. 7, 2013

Related U.S. Application Data

(63) Continuation of application No. PCT/CN2011/085154, filed on Dec. 31, 2011.

(30) Foreign Application Priority Data

Jan. 12, 2011   (CN) .......................... 2011 1 0005815

(51) Int. Cl.
*H04W 52/02*  (2009.01)
*H04W 76/04*  (2009.01)
*H04L 5/00*   (2006.01)

(52) U.S. Cl.
CPC ..... *H04W 52/0209* (2013.01); *H04W 52/0216* (2013.01); *H04W 76/048* (2013.01); *H04L 5/0098* (2013.01)

(58) Field of Classification Search
None
See application file for complete search history.

(56) References Cited

U.S. PATENT DOCUMENTS

| 2008/0181127 A1 | 7/2008 | Terry et al. |
| 2008/0214249 A1 | 9/2008 | Kim et al. |

(Continued)

FOREIGN PATENT DOCUMENTS

| CN | 101411095 A | 4/2009 |
| CN | 101583178 A | 11/2009 |

(Continued)

OTHER PUBLICATIONS

"3GPP TS 36.321—$3^{rd}$ Generation Partnership Project; Technical Specification Group Radio Access Network; Evolved Universal Terrestrial Radio Access (E-UTRA); Medium Access Control (MAC) protocol specification (Release 10)," Dec. 2010, Version 10.0.0, $3^{rd}$ Generation Partnership Project, Valbonne, France.

(Continued)

*Primary Examiner* — Huy D Vu
*Assistant Examiner* — Hong Shao
(74) *Attorney, Agent, or Firm* — Leydig, Voit & Mayer, Ltd.

(57) ABSTRACT

A method and a device for discontinuous reception is disclosed. The method includes: configuring at least two on-duration time lengths of a discontinuous reception; performing the discontinuous reception according to a first on-duration time length in the at least two on-duration time lengths; switching the first on-duration time length of the discontinuous reception to a second on-duration time length according to the configured at least two on-duration time lengths when a set condition is satisfied; and performing the discontinuous reception according to the second on-duration time length.

12 Claims, 8 Drawing Sheets

(56) References Cited

U.S. PATENT DOCUMENTS

| | | | |
|---|---|---|---|
| 2008/0248840 A1* | 10/2008 | Kim et al. | 455/574 |
| 2010/0002612 A1* | 1/2010 | Hsu | H04W 52/0232 |
| | | | 370/311 |
| 2010/0091693 A1 | 4/2010 | Pelletier et al. | |
| 2010/0110896 A1 | 5/2010 | Tseng et al. | |
| 2010/0110897 A1 | 5/2010 | Chun et al. | |
| 2010/0118815 A1* | 5/2010 | Kim et al. | 370/329 |
| 2010/0130214 A1 | 5/2010 | Ahluwalia | |
| 2010/0135159 A1 | 6/2010 | Chun et al. | |
| 2012/0182916 A1 | 7/2012 | Pelletier et al. | |
| 2013/0265924 A1 | 10/2013 | Kim et al. | |

FOREIGN PATENT DOCUMENTS

| | | |
|---|---|---|
| CN | 101682885 A | 3/2010 |
| CN | 101682888 A | 3/2010 |
| CN | 101925161 A | 12/2010 |
| WO | WO 2009114800 A2 | 9/2009 |
| WO | WO 2009132329 A2 | 10/2009 |
| WO | WO 2009139572 A2 | 11/2009 |
| WO | WO 2010053330 A2 | 5/2010 |
| WO | WO 2010147956 A2 | 12/2010 |

OTHER PUBLICATIONS

International Search Report in corresponding PCT Patent Application No. PCT/CN2011/085154 (Mar. 8, 2012).
Written Opinion of the International Searching Authority in corresponding PCT Patent Application No. PCT/CN2011/085154 (Mar. 8, 2012).

* cited by examiner

METHOD, DEVICE AND SYSTEM FOR DISCONTINUOUS RECEPTION

CROSS-REFERENCE TO RELATED APPLICATIONS

This application is a continuation of International Patent Application No PCT/CN2011/085154, filed on Dec. 31, 2011, which claims priority to Chinese Patent Application No. 201110005815.5, filed on Jan. 12, 2011, both of which are hereby incorporated by reference in their entireties.

TECHNICAL FIELD

The present invention relates to the field of communication technologies, in particular, to a method, a device and a system for discontinuous reception.

BACKGROUND

In a mobile communication system, if data transmission is required, resource allocation for a terminal needs to be performed by a base station if data transmission is required. It is necessary for the terminal to determine when the base station performs resource allocation to it, so the terminal has to monitor PDCCH channel (Physical Downlink Control Channel, physical downlink control channel) all the time. If PDCCH signaling is detected, then it means that the base station has downlink resource allocation or uplink resource allocation. However, such action for detecting the PDCCH will seriously consume the power of the terminal.

In order to reduce the power consumption of the terminal, a DRX (Discontinuous Reception, discontinuous reception) technique is adopted. So-called DRX means that the terminal stops monitoring the PDCCH in a period of time. In the DRX mode, a DRX cycle needs to be configured for the terminal by the base station, and one DRX cycle includes a time period of on-duration (On-Duration) and a time period of opportunity for DRX (Opportunity for DRX). In this way, the terminal configured with DRX can monitor the PDCCH in each time period of the on-duration in the DRX cycle; correspondingly, the base station also can perform resource allocation for the terminal in each time period of the on-duration of the DRX cycle. It can be seen that the use of DRX technique has considerably shortened the time for the terminal detecting the PDCCH signaling, and achieved the effect of saving the power of the terminal.

In the prior art, however, the terminal can only operate based on one set of pre-configured DRX parameters (including a DRX cycle, a time period of the on-duration, a time period of opportunity for DRX, and etc). When the DRX parameters of the terminal need to be changed during the DRX procedure so as to further reduce the power consumption of the terminal or for other reasons, it can only be implemented by the base station sending RRC (Radio Resource Control, radio resource control) signaling to re-configure the DRX parameters of the terminal. But, this will result in additional RRC signaling at the air interface, while the transmission process of the RRC signaling is relatively complex and involves many protocol layers, which leads to more signaling overhead and increases system complexity.

SUMMARY

It is an object of the present invention to provide a method and a device for discontinuous reception, which can avoid additional RRC signaling overhead when switching the DRX parameter of the terminal and reduce system complexity.

In order to achieve the above object, one aspect of the present invention provides the following technical solution.

A method for discontinuous reception, comprising:
configuring at least two on-duration time lengths of a discontinuous reception;
performing the discontinuous reception according to a first on-duration time length in the at least two on-duration time lengths;
switching the first on-duration time length of the discontinuous reception to a second on-duration time length according to the configured at least two on-duration time lengths when a set condition is satisfied; and performing the discontinuous reception according to the second on-duration time length.

According to another aspect of the present invention, a device for discontinuous reception is provided, comprising:
a configuring unit, configured to configure at least two on-duration time lengths of a discontinuous reception;
a first discontinuous reception unit, configured to perform the discontinuous reception according to a first on-duration time length in the at least two on-duration time lengths;
a switching unit, configured to switch the first on-duration time length of the discontinuous reception to a second on-duration time length according to the configured at least two on-duration time lengths when a set condition is satisfied; and
a second discontinuous reception unit, configured to perform the discontinuous reception according to the second on-duration time length.

The following technical effects are achieved by the present invention according to embodiments of the present invention.

In embodiments of the present invention, since the base station configures several on-duration time lengths for the terminal, changing on-duration time length during a DRX process, if needed, no longer relies on re-configuration of the on-duration time length through the RRC signaling; the terminal can directly switch the on-duration time lengths when detecting that a set condition is satisfied, so as to achieve the changing of the on-duration time length. In other words, in the method provided according to embodiments of the present invention, additional RRC signaling overhead can be avoided, thereby reducing system complexity.

BRIEF DESCRIPTION OF THE DRAWINGS

To illustrate the technical solutions of embodiments of the present invention more clearly, the accompanying drawings used in the embodiments are briefly described hereunder. Apparently, the accompanying drawings illustrate only some embodiments of the present invention, and persons skilled in the art can derive other drawings from these drawings without creative effort.

DESCRIPTION OF EMBODIMENTS

The technical solutions of embodiments of the present invention are hereinafter described clearly and completely with reference to the accompanying drawings of embodiments of the present invention. Evidently, the described embodiments are only a part of the embodiments of the present invention, rather than all embodiments of the present invention. Based on the embodiments of the invention, all other embodiments obtained by persons skilled in the art are within the protection scope of the present invention.

Figure 1:
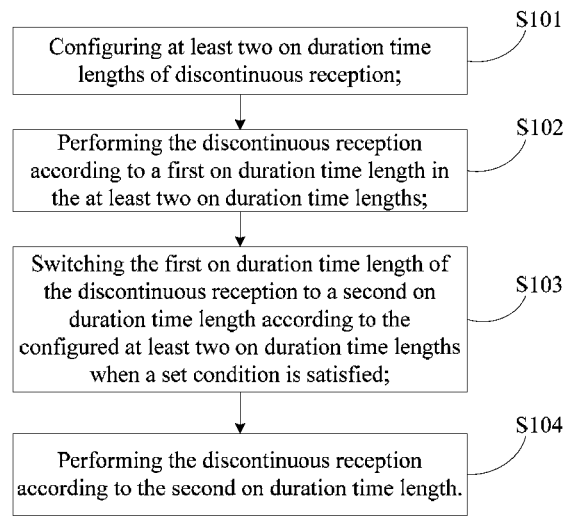
FIG. 1 is a flow chart of a method according to an embodiment of the present invention.

Referring to FIG. 1, a method for discontinuous reception according to an embodiment of the present invention comprises the following steps.

S101: Configure at least two on-duration time lengths of discontinuous reception.

This step may be executed prior to a terminal performing DRX, that is, on-duration time lengths that may be used are configured to the terminal before the terminal performs DRX. Since the configuration procedure is executed prior to DRX, it can be implemented through RRC signaling sent by the base station. Specifically, when sending signaling, the base station can either directly carry the values of various on-duration time lengths, or carry one on-duration time length, as well as the offset or difference with other time lengths, and various on-duration time lengths can be calculated and obtained by the terminal via the offset or difference, such that the amount of transferred information can be reduced.

S102: Perform the discontinuous reception according to a first on-duration time length in the at least two on-duration time lengths.

In addition to configuring various on-duration time lengths for the terminal, the base station also can configure for the user which on-duration time length is used to start the DRX. In this way, the terminal can start the DRX based on one on-duration time length according to the configuration of the base station.

S103: Switch the first on-duration time length of the discontinuous reception to a second on-duration time length according to the configured at least two on-duration time lengths when a set condition is satisfied.

The preset condition may be that: the terminal times the time of using a certain on-duration time length to perform DRX; if a preset using time length of the on-duration time length (the preset using time length can be configured solely by the base station, or can be calculated by the terminal based on other DRX parameters configured by the base station) is exceeded, then the switching of the on-duration time length may be performed.

Alternatively, a switching indication may be sent by the base station to the terminal through MAC layer signaling, and the terminal performs the switching of the on-duration time length according to the indication of the base station. It should be noted that, since the various on-duration time lengths have been pre-configured, the base station can directly send a switching indication through MAC layer signaling without carrying the specific length value information, and compared to RRC signaling, the MAC layer signaling is relatively simple to realize, therefore, system complexity also can be reduced.

Furthermore, other conditions also can be set, which are not limited herein.

S104: Perform the discontinuous reception according to the second on-duration time length.

After switching the on-duration time length, the DRX can be performed with the switched on-duration time length.

It can be seen that in embodiments of the present invention, since the base station configures several on-duration time lengths for the terminal, changing on-duration time length during the DRX procedure, if needed, no longer relies on re-configuration of the on-duration time length through the RRC signaling; the terminal can directly switch the on-duration time length when detecting that a set condition is satisfied, so as to achieve the changing of the on-duration time length. In other words, in the method provided according to embodiments of the present invention, additional RRC signaling overhead can be avoided, thereby reducing system complexity.

In specific implementation, there may be various embodiments, which are described respectively as follows.

Embodiment 1

In embodiment 1, switching of on-duration time length can be performed when a discontinuous reception cycle remains unchanged. That is, when a set condition is satisfied, the first on-duration time length of the discontinuous reception is switched to a second on-duration time length according to the configured at least two on-duration time lengths, in case that the discontinuous reception cycle remaining unchanged. In other words, the base station can configure at least two on-duration time lengths for the terminal, and the DRX cycle remains unchanged throughout the DRX procedure. The DRX cycle consists of a time period of on-duration and a time period of opportunity for DRX, and thus if the length of the time period of on-duration changes, the length of the time period of opportunity for DRX will also change accordingly, but in any case the sum of the two remains constant.

In this case, the base station can directly configure a first on-duration time length and a second on-duration time length for the terminal, and the first on-duration time length is longer than the second on-duration time length. So, when performing specific switching, a first using time may be set, when the time length of using the first on-duration time length to perform the DRX reaches the first using time, the first on-duration time length of the DRX is switched to the second on-duration time length.

For illustrative purposes, in embodiments of the invention, the first on-duration time length may be referred to as a long on-duration time length, and the second on-duration time length may be referred to as a short on-duration time length. The terminal can start the DRX with the long on-duration time length. When a set condition is satisfied, for example, when the time length of using the long on-duration time length to perform the DRX reaches the preset first using time length of the long on-duration time length, or, when a switching indication sent by the base station through MAC layer signaling is received, the on-duration time length can be switched to the short on-duration time length, and the DRX is performed according to the short on-duration time length. As already described, the first using time length can be pre-configured by the base station as a separate DRX parameter. Of course, the base station can also implicitly include the first using time length in other DRX parameters, and the terminal can calculate and obtain the first using time length from other DRX parameters. Where, the specific value of the first using time length can be set according to specific service characteristics, such as QoS (Quality of Service, quality of service).

The above mode of implementation, that is, starting DRX with the long on-duration time length and switching to the short on-duration time length when the time length of using the long on-duration time length to perform the DRX reaches the first using time length, has the practical significance as follows: due to not knowing about the information on terminal service usage when starting the DRX, the long on-duration time length can be used to avoid adversely affecting normal services; after a long period (the first using time) of performing DRX with the long on-duration time length, if it is observed that the terminal does not transmit any service data during this period, then it is considered that there is little possibility that the terminal will transmit service data subsequently, and as a result, the on-duration time length of the terminal can be further reduced, that is, a shorter on-duration time length may be used to perform the DRX, thereby the power of the terminal can be further saved.

In the practical application, of course, the terminal also can start the DRX with the short on-duration time length; when a set condition is satisfied, for example, when receiving a switching indication sent by the base station through MAC layer signaling or physical layer indication and etc., the on-duration time length can be switched to the long on-duration time length, and the DRX is performed according to the long on-duration time length.

Such an operation mode has the following practical significance: since the base station can perform resource scheduling only within the time period of on-duration of the terminal when the terminal performs DRX, as a result, once the base station misses the time period of on-duration of the terminal, the base station cannot perform resource scheduling until the time period of on-duration of the next DRX cycle arrives. In this way, if the DRX cycle is long, it will result in a large time delay to the downlink resource allocation. In the practical application, therefore, there may be the need to keep a constant DRX cycle and increase the on-duration time length, so as to relatively reduce the time length of opportunity for DRX so as to shorten the time delay of the downlink resource allocation. And such an operation mode can satisfy the need. For example, in order to shorten the time delay of the downlink resource allocation, the base station can send a switching indication to the terminal through MAC signaling, and then the on-duration time length is switched to the long on-duration time length by the terminal.

To facilitate the understanding, the embodiment 1 will be described in more details by way of example.

Figure 2:
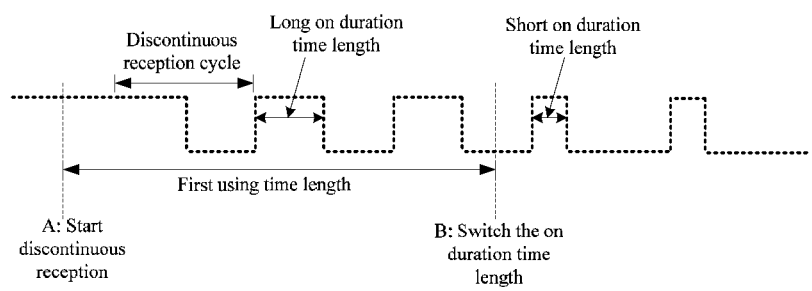
FIG. 2 is a schematic view of switching a first on-duration time according to an embodiment of the present invention.

Referring to FIG. 2, it is assumed that the base station configures the following DRX parameters for the terminal: a DRX cycle, a long on-duration time, a short on-duration time and a first using time length. The terminal starts DRX at point A in the figure, and starts a timer for employment of the long on-duration time. Seen from FIG. 2, at first the terminal starts the DRX according to the DRX cycle and the long on-duration time length (may also include other DRX parameters such as DRX start offset). When the time length of the terminal using the long on-duration time to perform the DRX reaches the configured first using time length, namely reaching point B, since there is no service data transmission through the procedure from point A to point B, then the terminal will switch the on-duration time length to the short on-duration time, and employ the short on-duration time length to perform the DRX.

It should be noted that, because the base station knows the first using time length, and also may know whether the terminal has service data transmission, and therefore, after the terminal switches the on-duration time length, the base station also can know that the terminal has performed the switching operation, and then the base station also can perform resource scheduling for the terminal according to the switched on-duration time length. Furthermore, it should be noted that the starting point (point A) of DRX in FIG. 2 is in a state of on-duration, while in practical application, point A also may be in a state of opportunity for DRX.

Embodiment 2

In embodiment 2, the terminal can perform switching of on-duration time length in the case of changed discontinuous reception cycle. That is, the DRX includes at least two DRX cycles, each of which is configured with at least one on-duration time length, respectively. In this embodiment, there are several scenarios, which will be described respectively as follows.

First case: the base station configures at least two discontinuous reception cycles for the terminal, and configures one on-duration time length respectively for each discontinuous reception cycle. In this way, the terminal can perform the discontinuous reception according to a designated DRX cycle of the various discontinuous reception cycles that are configured by the base station and the corresponding on-duration time length; when a set condition is satisfied, the discontinuous reception cycle is switched according to the various discontinuous reception cycles configured by the base station, and the on-duration time length is switched to the corresponding on-duration time length of the switched discontinuous reception cycle.

For example, the base station also can configure two DRX cycles for the terminal, i.e., a first DRX cycle and a second DRX cycle, and configure a first on-duration time length for the first DRX cycle and a second on-duration time length for the second DRX cycle, respectively. In this way, switching may be performed by setting a second using time; switching the first on-duration time length of the discontinuous reception to the second on-duration time length and switching the first discontinuous reception cycle of the discontinuous reception to the second discontinuous reception cycle, when the time length of using the first on-duration time length to perform the discontinuous reception reaches the second using time.

For example, the terminal can be configured with two DRX cycles, i.e., a long DRX cycle and a short DRX cycle, and meanwhile respective on-duration time lengths are configured for the two DRX cycles respectively. It can be seen that at least two on-duration time lengths are also configured in this case, unlike the embodiment 1, various on-duration time lengths correspond to different DRX cycles.

Figure 3:
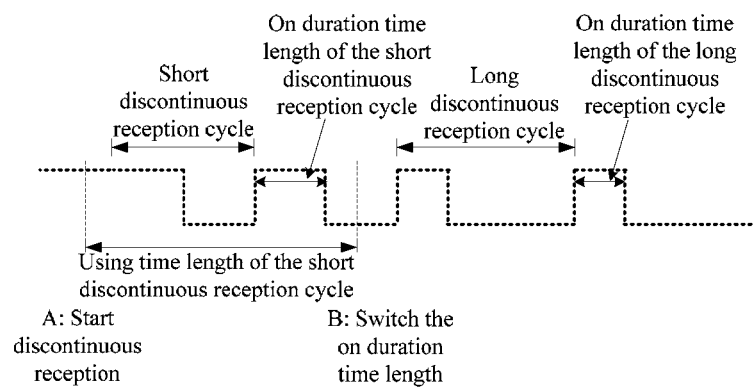
FIG. 3 is a schematic view of switching a second on-duration time according to an embodiment of the present invention.

In this case, the set condition may be to time a period of using certain DRX, and may also be that the base station sends a switching indication through MAC layer signaling. For example, the base station also can configure a second using time length for the terminal and the terminal can take the second using time length as the switching basis. Specifically, referring to FIG. 3, assuming that the terminal starts DRX at point A according to the short discontinuous reception cycle and the corresponding on-duration time length thereof, and also starts the timing; during the DRX with the short discontinuous reception cycle, the on-duration time length configured for the short discontinuous reception cycle is used for performing the DRX; when the time length of using the short discontinuous reception cycle to perform the DRX reaches the second using time length, and if there is no service for the terminal all the time, the short DRX cycle of the DRX is switched to the long DRX cycle, and the on-duration time length corresponding to the long DRX cycle is used for performing the DRX; and during the DRX with the long discontinuous reception cycle, the on-duration time length configured for the long discontinuous reception cycle is used for performing the DRX.

It can be seen in the first case that the switching of the DRX cycle and on-duration time length is synchronous, and the switching of the on-duration time length occurs along with the switching of the DRX cycle.

Second case: the base station configures for the terminal at least two discontinuous reception cycles including a first DRX cycle and a second DRX cycle; and at least three on-duration time lengths of DRX including the first on-duration time length, the second on-duration time length and a third on-duration time length; where the first on-duration time length is configured for the first DRX cycle, and the second on-duration time length and the third on-duration time length are configured for the second DRX cycle. During specific switching a third using time and a fourth using time may be set; when an using time of the first DRX cycle reaches the third using time, the first DRX cycle of the DRX is switched to the second DRX cycle, and the first on-duration time length of the DRX is switched to the second on-duration time length; and when the using time of the second on-duration time length of the second DRX cycle reaches the fourth using time, the second on-duration time length of the second DRX cycle is switched to the third on-duration time length.

Different from the first case, the DRX cycles may have no corresponding relationship with the on-duration time lengths. The terminal can start the discontinuous reception according to a designated DRX cycle of the various DRX cycles and a designated on-duration time length in the various on-duration time lengths configured by the base station; and in the same DRX cycle, the on-duration time length also can be switched according to the various on-duration time lengths configured by the base station, when a set condition is satisfied.

Similarly, at this time, the set condition may be to time the time of using certain DRX, and may also be that the base station sends a switching indication through MAC layer signaling. In specific implementation, the base station also can configure a third using time length for the DRX cycle used when starting the DRX, and configure a fourth using time length for the on-duration time length first used in the same DRX cycle, where the third using time length is longer than or reaches the second using time length; and the third using time length can be longer than the fourth using time length. At this time, with the same DRX cycle, when the time of using the first-used on-duration time length to perform the discontinuous reception reaches the fourth using time length, the on-duration time length is switched according to the various on-duration time lengths configured by the base station; when the time of using the discontinuous reception cycle, which is used when starting the discontinuous reception, to perform the discontinuous reception reaches the third using time length, the discontinuous reception cycle is switched and the on-duration time length is switched to the on-duration time length first used in the same discontinuous reception cycle.

Figure 4:
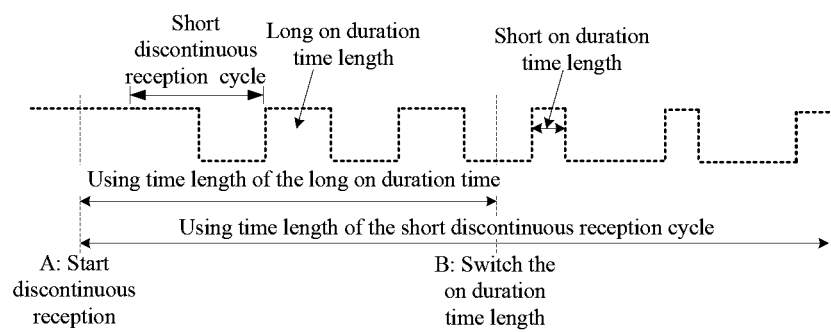
FIGS. 4(a) and 4(b) are schematic views of switching a third on-duration time according to an embodiment of the present invention.
Figure 4:
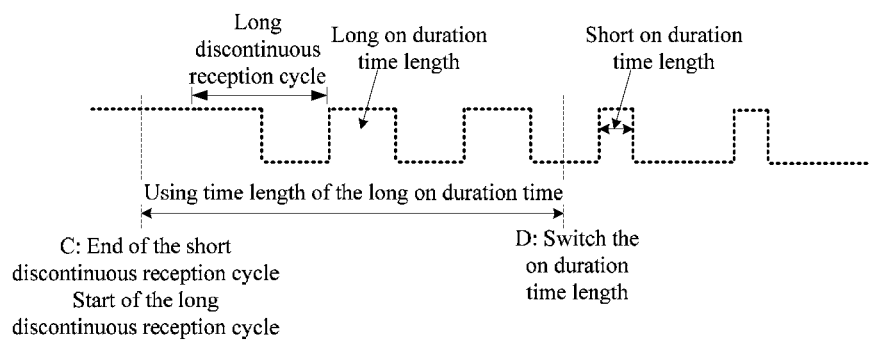

For example, the base station can configure the following DRX parameters for the terminal: two DRX cycles, namely a short DRX cycle and a long DRX cycle, a using time length of the short DRX cycle, two on-duration time lengths, namely a long on-duration time and a short on-duration time, and an using time length of the long on-duration time. Moreover, the using time length of the short DRX cycle is greater than the using time length of the long on-duration time. Assuming that DRX is started with the short DRX cycle, and the long on-duration time is always used first in every discontinuous reception cycle. Referring to FIG. 4(a), the terminal starts DRX with the short DRX cycle and the long on-duration time at point A, when arriving at point B, the time of using the long on-duration time to perform the DRX reaches the using time length of the long on-duration time, then switch to the short on-duration time. Referring to FIG. 4(b), when arriving at point C, the time of using the short DRX cycle to perform the DRX reaches the using time length of the short DRX cycle, then switch to the long DRX cycle. In the period of the long DRX cycle, the DRX can be performed at first with the long on-duration time, and when the time of using the long on-duration time to perform the DRX reaches the using time length of the long on-duration time at point D, the on-duration time length is switched to the short on-duration time; optionally, in the period of the long DRX cycle, the short on-duration time may be used first, and then when the time of using the short on-duration time reaches the above using time length, the on-duration time length is switched to the long on-duration time.

In the practical application, there may be the case that the third using time length is less than the fourth using time length, namely, the using time length of the DRX cycle configured by the base station is less than the using time length of a certain on-duration time length. For this case, the switching can be performed as follows: when the time of using the discontinuous reception cycle, which is used when starting the DRX, to perform the discontinuous reception reaches the third using time length, switch the DRX cycle and continue to employ the on-duration time length, which is first used in the same discontinuous reception cycle, to perform the discontinuous reception; and when the time of using the on-duration time length, which is currently used in the same discontinuous reception cycle, to perform the discontinuous reception reaches the fourth using time length, switch the on-duration time length according to the various on-duration time lengths configured by the base station.

Figure 5:
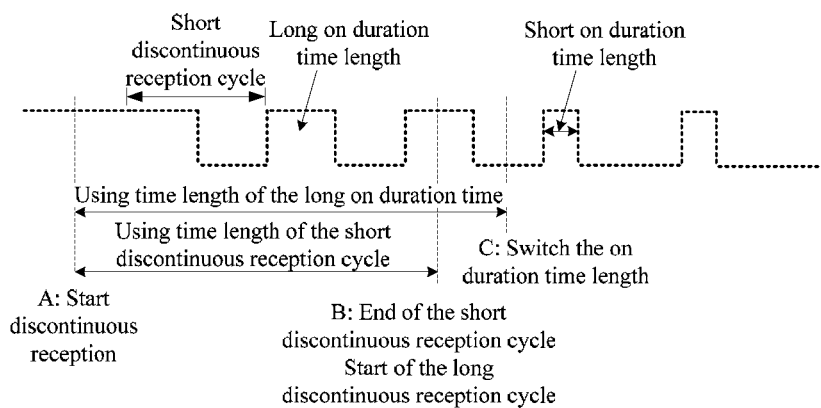
FIG. 5 is a schematic view of switching a fourth on-duration time according to an embodiment of the present invention.

For example, referring to FIG. 5, assuming that a long DRX cycle, a short DRX cycle, a using time length of the short DRX cycle, a long on-duration time, a short on-duration time and an using time length of the long on-duration time are configured. Where, the using time length of the short DRX cycle is less than that of the long on-duration time. The terminal starts DRX at point A with the short DRX cycle and the long on-duration time. When arriving at point B, a timer for the short DRX cycle times out, but a timer for the long on-duration time is still performing. At this time, the DRX cycle may be switched to the long DRX cycle, and the on-duration time length remains unchanged until the timer of the long on-duration time times out, then the on-duration time length is switched to the short on-duration time length.

Third case: in this case, the base station also can configure at least two DRX cycles for the terminal; and at least three on-duration time lengths of DRX for the terminal, where the at least three on-duration time lengths include a first on-duration time length, a second on-duration time length and a third on-duration time length; where the first DRX cycle is configured with the first on-duration time length and the second on-duration time length, and the second DRX cycle is configured with the third on-duration time length. In this way, when switching, a fifth using time and a sixth using time may be set; when the using time of the first on-duration time length of the first DRX cycle reaches the fifth using time, the first on-duration time length of the first DRX cycle is switched to the second on-duration time length; and when the using time of the first DRX cycle reaches the sixth using time, the first DRX cycle of the DRX is switched to the second DRX cycle and the second on-duration time length of the DRX is switched to the third on-duration time length.

For example, at least two on-duration time lengths can be configured respectively for various DRX cycles; namely, in every DRX cycle, respective on-duration time lengths are used to perform DRX and switching of the on-duration time length. Particularly, DRX may be performed according to a designated DRX cycle of various DRX cycles configured by the base station and the corresponding first-used on-duration time length thereof; in the same DRX cycle and when switching the DRX cycle, the on-duration time length is switched according to various on-duration time lengths configured by the base station when a set condition is satisfied.

The set condition also can be implemented by using a timer, for example, the base station also can configure an using time length (a fifth using time length) for the DRX cycle used when starting DRX, and configure an using time length (a sixth using time length) for the on-duration time length first used in the same discontinuous reception cycle, where the fifth using time length is greater than the sixth using time length. During switching the on-duration time length, in the same DRX cycle, when the time of using the first-used on-duration time length to perform the DRX reaches the sixth using time length, the on-duration time length is switched according to the various on-duration time lengths configured by the base station for the DRX; when the time of using the DRX cycle, which is used when starting the DRX, reaches the fifth using time length, the DRX cycle is switched and the on-duration time length is switched to the corresponding first-used on-duration time length of the DRX cycle switched to.

For example, the base station can configure two DRX cycles for the terminal: a short DRX cycle and a long DRX cycle, and configure two on-duration time lengths for the short DRX cycle, which are a first on-duration time length and a second on-duration time length respectively; and configure two on-duration time lengths for the long DRX cycle, which are a third on-duration time length and a fourth on-duration time length respectively. Moreover, DRX is started with the short DRX cycle, and the first on-duration time length is first used in the short DRX cycle and the third on-duration time length is first used in the long DRX cycle.

After starting the DRX, the short DRX cycle and the first on-duration time length are used first, and when the time of using the first on-duration time length to perform the DRX reaches the using time length of the first on-duration time length, switch to the second on-duration time length. At this time, the DRX cycle is still the short DRX cycle, and the timer for DRX cycle continues performing. When the time of using the short DRX to perform the DRX reaches the using time length of the short DRX cycle, the DRX cycle is switched to the long DRX cycle, and meanwhile, the on-duration time length is switched to the third on-duration time length; likewise, when the time of using the third on-duration time length to perform the DRX reaches the using time length of the third on-duration time length, switch to the fourth on-duration time length. The above has described several embodiments, and it can be seen that the embodiments of the present invention equivalently provide an enhanced DRX mechanism, the performing of which needs the support of the terminal, in other words, only when the terminal supports the enhanced DRX mechanism, the method described in the embodiments of the present invention can be used to perform DRX. Therefore, the base station needs to treat different terminals differently when configuring DRX parameters to the terminal. To this end, the embodiments of the present invention further provide the technical solutions as follows.

After the terminal successfully accesses the network, information on whether it supports the enhanced DRX mechanism may be reported to the base station through an RRC message either in a manner of a support indicator, such as support/non-support; or a capability information, indicating support if present and indicating non-support if absent; or a Boolean quantity, 1 or True for support and 0 or False for non-support, and so on.

In this way, whether the terminal supports the enhanced DRX mechanism can be determined after the base station receives the indication of the terminal, if support, then the enhanced DRX parameters are configured for the terminal, such as the long on-duration time, the short on-duration time, the using time length of the long on-duration time; if the DRX cycle needs to be changed, the long DRX cycle and the short DRX cycle can also be configured for the terminal, and so on. After the terminal receives these enhanced DRX parameters, the method according to the embodiments of the present invention can be used to perform the enhanced DRX.

To sum up, in embodiments of the present invention, the base station pre-configures several on-duration time lengths for the terminal, and thus during the DRX procedure, the changing of the on-duration time length, if needed, is no longer dependent on the re-configuration of the on-duration time length by the RRC signaling. Instead, a condition is directly set for the switching, and then, the terminal can directly switch the on-duration time length when the set condition is satisfied, so as to achieve the changing of the on-duration time length. In other words, in the method provided according to embodiments of the present invention, additional RRC signaling overhead can be prevented, thereby reducing system complexity.

Figure 6:
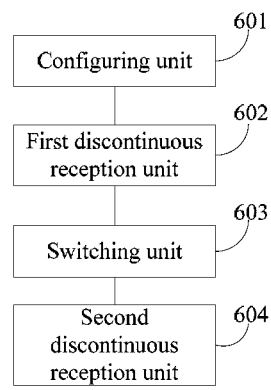
FIG. 6 is a schematic view of a first device according to an embodiment of the present invention.

Corresponding to the method for discontinuous reception provided by embodiments of the present invention, a device for discontinuous reception is also provided. Referring to FIG. 6, the device includes the following units:

a configuring unit 601, configured to configure at least two on-duration time lengths of discontinuous reception;

a first discontinuous reception unit 602, configured to perform the discontinuous reception according to a first on-duration time length in the at least two on-duration time lengths;

a switching unit 603, configured to switch the first on-duration time length of the discontinuous reception to a second on-duration time length according to the configured at least two on-duration time lengths when a set condition is satisfied;

a second discontinuous reception unit 604, configured to perform the discontinuous reception according to the second on-duration time length.

Figure 7:
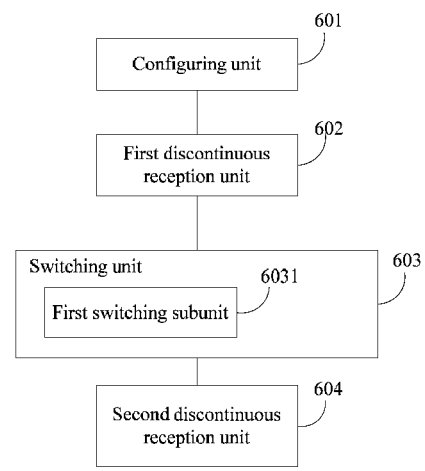
FIG. 7 is a schematic view of a second device according to an embodiment of the present invention.

Specifically, referring to FIG. 7, the switching unit 603 may include:

a first switching subunit 6031, configured to switch the first on-duration time length of the discontinuous reception to the second on-duration time length according to the configured at least two on-duration time lengths when a set condition is satisfied, in a case that a discontinuous reception cycle remaining unchanged.

The first on-duration time length configured by the configuring unit 601 may be longer than the second on-duration time length.

Figure 8:
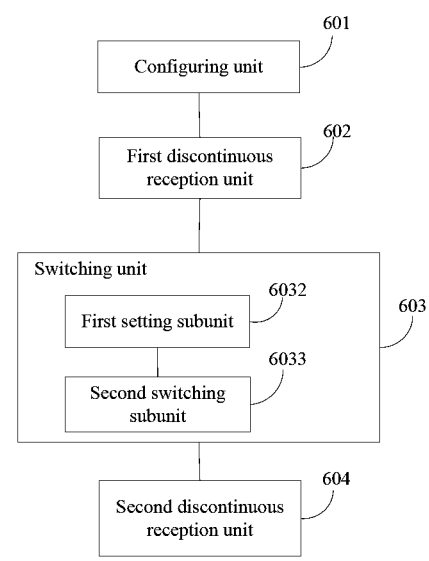
FIG. 8 is a schematic view of a third device according to an embodiment of the present invention.

In other embodiments, referring to FIG. 8, the switching unit 603 may include:

a first setting subunit 6032, configured to set a first using time;

a second switching subunit 6033, configured to switch the first on-duration time length of the discontinuous reception to the second on-duration time length according to the configured at least two on-duration time lengths when the time length of using the first on-duration time length to perform the discontinuous reception reaches the first using time.

In one embodiment, the configuring unit 601 is specially configured to: when the discontinuous reception includes at least two discontinuous reception cycles, respectively configure at least one on-duration time length for the at least two on discontinuous reception cycles.

Figure 9:
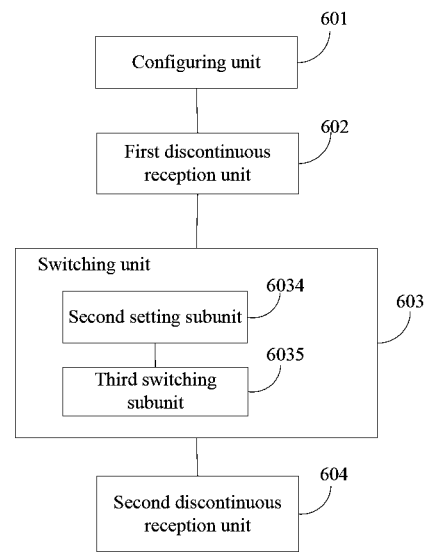
FIG. 9 is a schematic view of a fourth device according to an embodiment of the present invention.

The configuring unit 601 is specially configured to: when the at least two discontinuous reception cycles include a first discontinuous reception cycle and a second discontinuous reception cycle, configure the first on-duration time length for the first discontinuous reception cycle and configure the second on-duration time length for the second discontinuous reception cycle;

Referring to FIG. 9, the switching unit 603 includes:

a second setting subunit 6034, configured to set a second using time;

a third switching subunit 6035, configured to switch the first on-duration time length of the discontinuous reception to the second on-duration time length and switch the first discontinuous reception cycle of the discontinuous reception to the second discontinuous reception cycle, when the time length of using the first on-duration time length to perform the discontinuous reception reaches the second using time.

Figure 10:
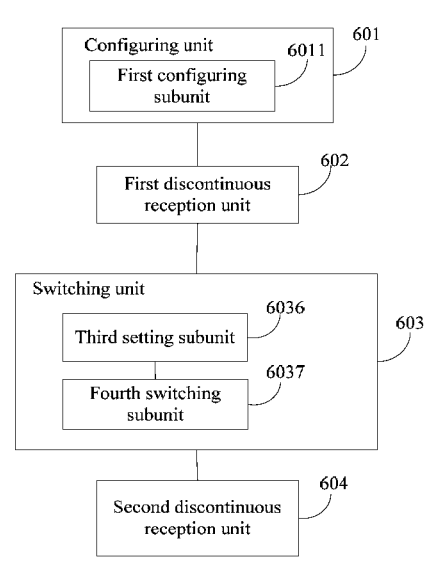
FIG. 10 is a schematic view of a fifth device according to an embodiment of the present invention.

In another embodiment, the at least two discontinuous reception cycles can include a first discontinuous reception cycle and a second discontinuous reception cycle;

Correspondingly, referring to FIG. 10, the configuring unit 601 can include:

a first configuring subunit 6011, configured to configure at least three on-duration time lengths of the discontinuous reception; the at least three on-duration time lengths include the first on-duration time length, the second on-duration time length and a third on-duration time length; where the first discontinuous reception cycle is configured with the first on-duration time length, and the second discontinuous reception cycle is configured with the second on-duration time length and the third on-duration time length;

The switching unit 603 includes:

a third setting subunit 6036, configured to set a third using time and a fourth using time;

a fourth switching subunit 6037, configured to switch the first discontinuous reception cycle of the discontinuous reception to the second discontinuous reception cycle and switch the first on-duration time length of the discontinuous reception to the second on-duration time length, when an using time of the first discontinuous reception cycle reaches the third using time; and configured to switch the second on-duration time length of the second discontinuous reception cycle to the third on-duration time length, when an using time of the second on-duration time length of the second discontinuous reception cycle reaches the fourth using time.

Figure 11:
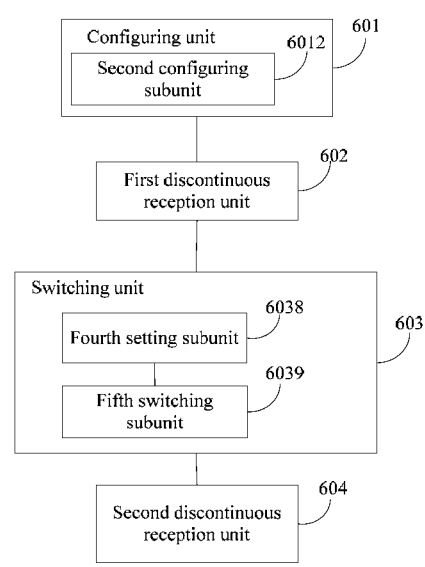
FIG. 11 is a schematic view of a six device according to an embodiment of the present invention.
Figure 12:
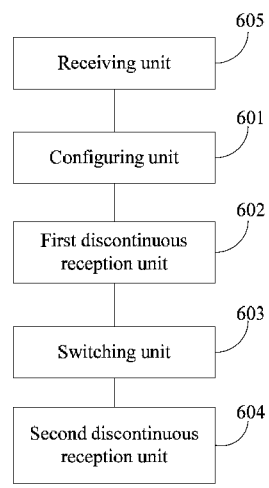
FIG. 12 is a schematic view of a seventh device according to an embodiment of the present invention.

In other embodiments, the at least two discontinuous reception cycles can include a first discontinuous reception cycle and a second discontinuous reception cycle;

Referring to FIG. 11, the configuring unit 603 includes:

a second configuring subunit 6012, configured to configure at least three on-duration time lengths of the discontinuous reception; the at least three on-duration time lengths include the first on-duration time length, the second on-duration time length and a third on-duration time length; where the first discontinuous reception cycle is configured with the first on-duration time length and the second on-duration time length, and the second discontinuous reception cycle is configured with the third on-duration time length;

The switching unit 603 can include:

a fourth setting subunit 6038, configured to set a fifth using time and a sixth using time;

a fifth switching subunit 6039, configured to switch the first on-duration time length of the first discontinuous reception cycle to the second on-duration time length, when an using time of the first on-duration time length of the first discontinuous reception cycle reaches the fifth using time; and configured to switch the first discontinuous reception cycle of the discontinuous reception to the second discontinuous reception cycle and switch the second on-duration time length of the discontinuous reception to the third on-duration time length, when an using time of the first discontinuous reception cycle reaches the sixth using time.

Specifically, the device also can include:

a receiving unit 605, configured to receive radio resource control RRC signaling sent by the base station;

Correspondingly, the configuring unit 603 is specifically configured to:

configure at least two on-duration time lengths of the discontinuous reception according to the received RRC signaling by the receiving unit 605. In the device for discontinuous reception provided by embodiments of the present invention, the base station configures several on-duration time lengths for the terminal, and thus during the DRX procedure, changing of the on-duration time length, if needed, is no longer dependent on the re-configuration of on-duration time length by the RRC signaling. Instead, the terminal can directly switch the on-duration time length when detecting that a set condition is satisfied, so as to achieve the changing of the on-duration time length. In other words, in the method provided according to the embodiments of the present invention, additional RRC signaling overhead can be prevented, thereby reducing system complexity.

Since the embodiments of the device correspond with the embodiments of the method, for parts not detailed in the embodiments of the device, see the embodiments of the method, and the details will not be described herein again.

It should be appreciated by persons skilled in the art that, all or a part of the steps in the method of the above embodiments may be completed by relevant hardware under the instruction of a program, and the program may be stored in a computer readable storage medium, when the program is executed, the following steps are performed: configuring at least two on-duration time lengths of discontinuous reception; performing the discontinuous reception according to a first on-duration time length in the at least two on-duration time lengths; switching the first on-duration time length of the discontinuous reception to a second on-duration time length according to the configured at least two on-duration time lengths when a set condition is satisfied; and performing the discontinuous reception according to the second on-duration time length. The storage medium may be, such as a read only memory (ROM)/random access memory (RAM), a floppy disk, or an optical disk, etc.

The method and the device for discontinuous reception of the present invention have been introduced in detail above. In the present invention, the specific cases are used to explain the principle and embodiments of the invention, and the above description of embodiments is merely intended to facilitate understanding the methods of the invention and its core concept; meanwhile, it is apparent to persons skilled in the art that changes can be made to the specific implementation and application scope of the present invention based on the concept of the invention. In view of the above, the contents of the specification shall not be considered as a limitation to the present invention.

What is claimed is:

1. A method, comprising:
receiving, by a terminal from a base station, a configuration comprising information about at least three on-duration time lengths of discontinuous reception, and the at least three on-duration time lengths comprise a first on-duration time length, a second on-duration time length and a third on-duration time length, and the first on-duration time length is used in a first discontinuous reception cycle, the second on-duration time length is used in a second discontinuous reception cycle, and the third on-duration time length is used in a third discontinuous reception cycle;
starting, by the terminal, a discontinuous reception in the first on-duration time length in the first discontinuous reception cycle;
switching, by the terminal, the first on-duration time length into the second on-duration time length once a time length of using the first discontinuous reception cycle reaches a first time length;
switching, by the terminal, the second on-duration time length into the third on-duration time length once a time length of using the second discontinuous reception cycle reaches a second time length; and
performing, by the terminal, the discontinuous reception in the third discontinuous reception cycle according to the third on-duration time length.

2. The method according to claim 1, wherein
the information about the at least three on-duration time lengths of discontinuous reception comprises the second on-duration time length and a first offset value and a second offset value; and
before starting the discontinuous reception, the method further comprises:
obtaining, by the terminal, the first on-duration time length in accordance with the first offset value and the second on-duration time length, and obtaining, by the terminal, the third on-duration time length in accordance with the second offset value and the second on-duration time length.

3. The method according to claim 1, wherein
the information about the at least three on-duration lengths of discontinuous reception comprises the first on-duration time length and a third offset value and a fourth offset value; and
before starting the discontinuous reception, the method further comprises:
obtaining, by the terminal, the second on-duration time length in accordance with the third offset value and the first on-duration time length, and obtaining, by the terminal, the third on-duration time length in accordance with the fourth offset value and the first on-duration time length.

4. The method according to claim 1, wherein receiving the configuration comprises:
receiving radio resource control (RRC) signaling from the base station, wherein the RRC signaling comprises the configuration.

5. A terminal, comprising:
a receiver, and
a processor coupled with the receiver, wherein
the receiver is configured to receive, from a base station, a configuration comprising information about at least three on-duration time lengths of discontinuous reception, and the at least three on-duration time lengths comprise a first on-duration time length, a second on-duration time length and a third on-duration time length, and the first on-duration time length is used in a first discontinuous reception cycle, the second on-duration time length is used in a second discontinuous reception cycle, and the third on-duration time length is used in a third discontinuous reception cycle;
the processor is configured to start a discontinuous reception in the first on-duration time length in the first discontinuous reception cycle, switch the first on-duration time length into the second on-duration time length once a time length of using the first discontinuous reception cycle reaches a first time length, switch the second on-duration time length into the third on-duration time length once a time length of using the second discontinuous reception cycle reaches a second time length, and perform the discontinuous reception in the third discontinuous reception cycle according to the third on-duration time length.

6. The terminal according to claim 5, wherein
the information about the at least three on-duration time lengths of discontinuous reception comprises the second on-duration time length and a first offset value and a second offset value; and
the processor is further configured to, before starting the discontinuous reception, obtain the first on-duration time length in accordance with the first offset value and the second on-duration time length, and obtain the third on-duration time length in accordance with the second offset value and the second on-duration time length.

7. The terminal according to claim 5, wherein
the information about the at least three on-duration lengths of discontinuous reception comprises the first on-duration time length and a third offset value and a fourth offset value; and
the processor is further configured to, before starting the discontinuous reception, obtain the second on-duration time length in accordance with the third offset value and the first on-duration time length, and obtain the third on-duration time length in accordance with the fourth offset value and the first on-duration time length.

8. The terminal according to claim 5, wherein the configuration is received through radio resource control (RRC) signaling.

9. A base station, comprising:
a transmitter, and
a processor coupled with the transmitter, wherein
the processor is configured to obtain a configuration comprising information about at least three on-duration time lengths of discontinuous reception, and the at least three on-duration time lengths comprise a first on-duration time length, a second on-duration time length and a third on-duration time length, and the first on-duration time length is used in a first discontinuous reception cycle, the second on-duration time length is used in a second discontinuous reception cycle, and the third on-duration time length is used in a third discontinuous reception cycle; and
the transmitter is configured to send the configuration to a terminal;
and wherein the first time on-duration length is used by the terminal to start a discontinuous reception in the first on-duration time length, and the second on-duration time length is used by the terminal to perform the discontinuous reception after the first on-duration time length is switched into the second on-duration time length once a time length of using the first discontinuous reception cycle reaches a first time length, and the third on-duration time length is used by the terminal to perform the discontinuous reception after the second on-duration time length is switched into the third on-duration time length when a time length of using the second discontinuous reception cycle reaches a second time length.

10. The base station according to claim 9, wherein
the information about the at least three on-duration lengths of discontinuous reception comprises the second on-duration time length and a first offset value and a second offset value, wherein the first offset value is used by the terminal to obtain the first on-duration time length in accordance with the first offset value and the second on-duration time length, and the second offset value is used by the terminal to obtain the third on-duration time length in accordance with the second offset value and the second on-duration time length.

11. The base station according to claim 9, wherein
the information about the at least three on-duration lengths of discontinuous reception comprises the first on-duration time length and a third offset value and a fourth offset value, wherein the third offset value is used by the terminal to obtain the second on-duration time length in accordance with the third offset value and the first on-duration time length, and the fourth offset value is used by the terminal to obtain the third on-duration time length in accordance with the fourth offset value and the first on-duration time length.

12. The base station according to claim 9, wherein the configuration is sent through radio resource control (RRC) signaling.

* * * * *